J. VON EPLER.
PROCESS OF PRESERVING MEATS.
APPLICATION FILED OCT. 13, 1910.
992,488.
Patented May 16, 1911.
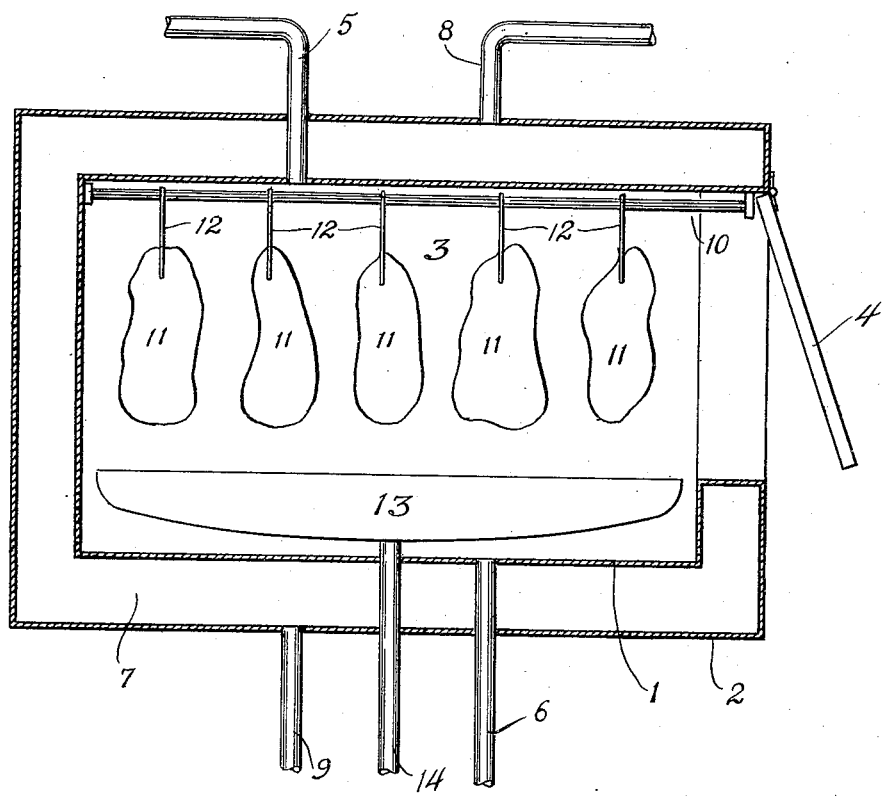
Witnesses:
Inventor:
Joseph von Epler.
By Banning & Banning
Attorneys.

UNITED STATES PATENT OFFICE.

JOSEPH VON EPLER, OF CHICAGO, ILLINOIS.

PROCESS OF PRESERVING MEATS.

992,488. Specification of Letters Patent. Patented May 16, 1911.

Application filed October 13, 1910. Serial No. 586,899.

*To all whom it may concern:*

Be it known that I, JOSEPH VON EPLER, a citizen of Australia, residing at Chicago, in the county of Cook and State of Illinois, have invented a certain new and useful Process for the Preservation of Meats, of which the following is a specification.

At the present time great quantities of meats are preserved and tinned in air-tight cans, so that they may be kept for a long time. In the preparation of the meat it is customary to cook it before tinning, and this is usually done by boiling until the meat is almost cooked enough. Thereafter it is cut up into pieces of proper size, which are placed in the tins. The tins are then heated to complete the cooking and are sealed while hot, so that, when they cool, practically all of the air will have been expelled and the meat will be preserved in a partial vacuum. It is found that this process of preparing meat is very wasteful, both in weight and volume of the completed product, as well as in its nutritive properties. It is found that during the boiling large amounts of nutritive matter, particularly albumen, are extracted into the water, so that the meat which is tinned has lost its most important nutritive constituents. Furthermore, these nutritive matters are largely lost because it is almost impossible to recover them from the water. The loss in weight is very large, and in many cases approximates 45%.

The process which forms the basis of my invention is intended to prepare the meat in such way that all or practically all of its nutritive properties will be retained, and in addition the amount of loss in weight and volume of the completed product will be very small. Furthermore, my process is one in which small amounts of albumen and other nutritive juices which may escape from the meat during the preparing process will retain their nutritive properties, so that they can be used for other purposes.

I have discovered the fact that if the meat is cooked in a bath of superheated steam, that is, steam which has been heated beyond the normal boiling point of water at the pressure which exists within the vessel containing the water, so that it contains an excess amount of heat and is dry, it will retain practically all of its original nutritive matter and properties, and that the moisture will be retained within it, so that it will lose very little of volume and weight during the cooking. I have, furthermore, discovered that when the meat is cooked in this manner it may be so supported within the cooking vessel or retort that any juices or other matter which may drip out from it may be caught and used as meat extracts, or in their preparation, or for other purposes, as desired.

In preparing meat by my improved process, the following manner of procedure is preferred: The meat, preferably raw, and either corned or uncorned, is placed cold into a retort of superheated steam, and left therein long enough to practically complete the cooking, and is then removed from the retort and cut up into blocks of proper size and placed in tins. Thereafter the tins are heated a short time—just long enough to complete the cooking process, if desired, but at any rate long enough to heat the meat and tins sufficiently so that the air will be driven off. Thereafter the tins may be sealed while hot, and when they cool the meat will be preserved in a vacuum.

It is found that very little of the juices will drip from the block of meat while it is being cooked in the superheated steam, and this seems to be due to the fact that within a very few minutes after the cold meat has been placed in the retort the albumen and other juices in the outer layers become coagulated, thus largely filling the pores in the outer portions of the block of meat and preventing the juices from the interior from running off. It is also found that the moisture of the steam bath is such that practically the entire moisture of the meat is retained in its original state within the body of the meat, so that the meat preserves all of its original nutrition, volume and weight, and so that the taste of the resulting product and its gastronomic properties are almost entirely preserved.

I have also discovered that the small amounts of juices which drip from the block of meat during the first few minutes of the cooking may be caught in any suitable manner, as by means of pans placed in the bottom of the retort. Inasmuch as the juices are not mixed with or diluted by water they retain their original nutritive value and are extremely valuable as meat extracts. Obviously, where the meat is cooked by boiling in a vat of water, these juices are largely lost, and even if they can be recovered to some extent they do not retain their original nutrition and excellent taste.

I do not limit my invention to any particular kind of meat, except as defined in the claim, nor do I find it necessary to use any particular kind of retort. However, in order to show one manner in which my invention may be carried out, I illustrate in the drawing a retort which is peculiarly adapted to this purpose. The retort illustrated comprises an inner shell 1, and an outer shell 2, spaced apart sufficiently to provide a steam space between them. The chamber 3 within the inner shell 1 may be closed, as by a door 4, during the cooking process. A pipe 5 serves to conduct superheated steam into the inner chamber 3, and a pipe 6 may be used to carry off the surplus superheated steam, or to carry off any condensation from it. In order to increase the heat efficiency, live steam from a boiler or other suitable source may be conducted into the space 7 between the inner and outer shells, by means of a pipe 8, and a pipe 9 may be used to carry off the condensation from this live steam. In the retort illustrated, a rail 10 is provided, so that blocks of meat 11 may be suspended from the same, as by means of hooks 12. In order to catch the juices which drip from the meat during the initial stages of the cooking, a pan 13 may be provided in the lower part of the retort, and the juice extracts may be carried off from the same by means of a pipe 14.

In the foregoing description, I have concerned myself generally with the application of my new process to all kinds of meat, whether corned or uncorned. In case it is desired to corn the meat, this may be done by injecting into each block of meat a sufficient amount of brine before the meat is cooked. Such injection may be made in any suitable manner, as by means of a syringe, and should preferably be made just before the meat is cooked.

I wish it to be understood that my process is one in which practically all of the original nutritive properties of the meat are retained within the same, while any small amounts of juice which drip from the meat may be caught and used for various purposes, and practically all of the original volume and weight of the meat will be retained, thus largely increasing its selling value. Furthermore, it is obvious that by the use of superheated steam I am enabled to regulate the temperature at which the cooking process is carried on, even to the extent of using extremely high temperatures. For example, if desired, the temperature of the steam during the initial stages of the process may be very high, so as to insure a quick coagulation of the albumen in the outer layers of the block of meat, so as to prevent the dripping of juices from the block of meat to a greater extent than would otherwise be possible. Thereafter the temperature of the steam could be reduced to a proper amount for carrying on the remainder of the cooking process.

Although I have shown and described a retort construction in which the blocks of meat are suspended from a rail, by means of hooks, still it is evident that any suitable device may be used for holding the meat, such, for example, as a number of shelves or layers of grating, upon each of which blocks of meat may be laid. Also, it is not necessary to use a jacket of live steam around the retort which contains the superheated steam, in case the radiation is not sufficient to lower the temperature within the retort below that necessary for carrying on the cooking process.

I claim:

The process of preserving meats which consists in placing them raw in a bath of superheated steam, having a substantial amount of superheat, maintaining said substantial amount of superheat only until the juices in the outer layers of the meat are coagulated, and then reducing the amount of superheat and thereafter continuing the cooking process in said reduced superheated steam for a suitable period of time, substantially as described.

JOSEPH von EPLER.

Witnesses:
FRANCES M. FROST,
THOMAS A. BANNING, Jr.

Copies of this patent may be obtained for five cents each, by addressing the "Commissioner of Patents, Washington, D. C."